United States Patent
Mayer et al.

(10) Patent No.: US 9,391,764 B2
(45) Date of Patent: Jul. 12, 2016

(54) ANTENNA SYNCHRONIZATION FOR COHERENT NETWORK MIMO

(75) Inventors: Hans-Peter Mayer, Ditzingen (DE); Heinz Schlesinger, Mundelsheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/256,148

(22) PCT Filed: Mar. 8, 2010

(86) PCT No.: PCT/EP2010/052887
§ 371 (c)(1),
(2), (4) Date: Sep. 12, 2011

(87) PCT Pub. No.: WO2010/102969
PCT Pub. Date: Sep. 16, 2010

(65) Prior Publication Data
US 2012/0002967 A1    Jan. 5, 2012

(30) Foreign Application Priority Data

Mar. 12, 2009 (EP) .................................... 09003607

(51) Int. Cl.
| | |
|---|---|
| *H04B 10/00* | (2013.01) |
| *H04L 7/00* | (2006.01) |
| *H04J 14/02* | (2006.01) |
| *H04W 88/08* | (2009.01) |

(52) U.S. Cl.
CPC ............ *H04L 7/0008* (2013.01); *H04J 14/0226* (2013.01); *H04W 88/085* (2013.01)

(58) Field of Classification Search
CPC  H04L 7/0008; H04J 14/0226; H04W 88/085; H04W 88/10; G06F 1/12; H03L 7/06
See application file for complete search history.

(56) References Cited

U.S. PATENT DOCUMENTS

| | | | | |
|---|---|---|---|---|
| 4,905,218 | A | * | 2/1990 | Takeuchi et al. ................. 398/43 |
| 5,046,066 | A | * | 9/1991 | Messenger .................... 370/349 |
| 5,361,154 | A | * | 11/1994 | Nakata ............................ 398/75 |
| 5,905,718 | A | | 5/1999 | Kurokami et al. |

(Continued)

FOREIGN PATENT DOCUMENTS

| | | |
|---|---|---|
| JP | H09-252278 | 9/1997 |
| JP | H 10200473 | 7/1998 |

(Continued)

OTHER PUBLICATIONS

International Search Report for PCT/EP2010/052887 dated Jun. 16, 2010.

(Continued)

*Primary Examiner* — Ken N Vanderpuye
*Assistant Examiner* — David Lambert
(74) *Attorney, Agent, or Firm* — Fay Sharpe, LLP

(57) ABSTRACT

The invention relates to a method for synchronizing RF antenna signals (5a to 5i) of a plurality of RF antenna sites (3a to 3i) arranged at different locations of a radio transmission system (1b), the method comprising; generating a reference signal (7) in a reference oscillator (6) located at a central unit (2) of the radio transmission system (1b), transmitting the reference signal (7) as an optical signal from the central unit (2) to the RF antenna sites (3a to 3i) via a plurality of optical fiber links (9a" to 9i"), and using the transmitted reference signal (7) for synchronizing the RF antenna signals (5a to 5i) of the different RF antenna sites (3a to 3i), The invention also relates to a radio transmission system (1b).

21 Claims, 2 Drawing Sheets

(56) References Cited

U.S. PATENT DOCUMENTS

| | | | |
|---|---|---|---|
| 5,995,483 A * | 11/1999 | Marchok | H04L 5/023 370/207 |
| 6,212,397 B1 | 4/2001 | Langston et al. | |
| 6,230,021 B1 | 5/2001 | Ohdachi | |
| 6,381,047 B1 * | 4/2002 | Frigo | H04B 10/506 398/79 |
| 8,059,969 B1 * | 11/2011 | Yap | 398/183 |
| 2006/0239687 A1 * | 10/2006 | Gopinath | 398/115 |
| 2007/0274279 A1 * | 11/2007 | Wood et al. | 370/343 |
| 2008/0205437 A1 * | 8/2008 | Cole | 370/464 |

FOREIGN PATENT DOCUMENTS

| | | | |
|---|---|---|---|
| JP | 2000151553 | 5/2000 | |
| JP | 2007228603 | 9/2007 | |
| JP | 2008-503974 | 2/2008 | |
| WO | WO 2006/063138 | 6/2006 | |
| WO | WO 2007/064058 A1 | 6/2007 | |
| WO | WO 2007064058 A1 * | 6/2007 | H04B 7/2693 |

OTHER PUBLICATIONS

Meinberg, GPS Oscillator—Rubidium, OCXO or TCXO—Accuracy of Frequency Outputs, printed Dec. 6, 2011, http://www.meinberg.de/english/specs/gpsopt.htm.

IEEE 1588 Products & Implementations, NIST Engineering Laboratory, printed Dec. 29, 2011, http://www.nist.gov/el/isd/iee/prodinfo1588.cfm.

Japanese Office Action dated Oct. 22, 2013 including translation.

* cited by examiner

ANTENNA SYNCHRONIZATION FOR COHERENT NETWORK MIMO

BACKGROUND OF THE INVENTION

The invention relates to a method for synchronizing RF antenna signals of a plurality of RF antenna sites arranged at different locations of a radio transmission system. The invention also relates to a radio transmission system adapted for performing the method.

Coherent network MIMO (Multiple-Input/Multiple-Output) offers a significant increase of spectral efficiency in radio transmission systems such as cellular networks, especially in systems with frequency re-use in which the same spectrum is used in each cell. In this case, the system performance is normally limited by inter-cell interference.

In order to draw maximum benefit from coherent network MIMO transmission in the downlink direction, i.e. from the RF antenna sites to the mobile stations, antennas located at distant antenna sites (e.g. located in a plurality of co-operating base stations or Remote Radio Heads of the same base station) should transmit radio signals with correlated phases (acting as "calibrated Antennas").

For this reason, a method to maintain the synchronization of the RF antenna signals is desired that limits deviations between the RF antenna signals (phase jitter) to less than a fraction of the RF period over a time frame in the order of some 100 ms. This period would be long enough to allow feedback mechanisms to control the phases. The carrier frequency of the radio signals is typically between 1 and 5 GHz for cellular applications and the spacing between the antennas can be in the order of e.g. 500 m to 1 km or even more for a macro-cellular environment.

The known methods for synchronisation of base stations are e.g. based on using the Ethernet backhaul link or alternatively on using a GPS clock reference, both of which will be shortly described in the following:

Use of IEEE 1588 or CPRI interface (Ethernet backhaul link):

In the category of Ethernet-based (or protocol based) synchronization there is one method according to IEEE 1588 and another one based on the CPR) interface. Methods of this category can reach synchronization down to a fraction of a microsecond, but they do not allow to maintain distant antennas calibrated to the above requirements.

Use of a GPS reference:

In the GPS case, the master clock (master oscillator) is located in the satellite of the GPS system and a 10 MHz reference signal is provided by the OPS satellite receiver unit. A GPS receiver is installed at each antenna site providing the signal that controls the oscillators.

However, both approaches, i.e. GPS and IEEE 1588, are not precise enough also for an another reason, resulting from the fact that Phase Locked Loops (PLLs) are used to generate the RF carrier signal from reference signals with much lower frequency:

Assuming a 2 GHz RF signal will be derived using a PLL from a 10 MHz reference signal, a PLL inband phase noise of 20 log(20 Hz/10 MHz)=46 dB will be achieved. However, the present RF-radio channel grid is in the region of 100 KHz up to 1 MHz and hence the PLL in-band phase noise will increase e.g. at a 100 KHz reference frequency to 86 dB. This will lead to a huge uncorrelated phase deviation within the individual RF-(LO) Oscillators in any Remote Radio Head, joined with an unwanted and non-correlated radio pattern (similar to a SDMA (Space Division Multiple Access) pattern) on the air interface.

As a result, all antennas that are co-operating in the transmission process require precise synchronisation using a signal derived from a master oscillator with a frequency in the order of the carrier frequency.

There is one commercially available solution for performing such a synchronization by using a GPS signal combined with a Rubidium (Rb) clock: In this case, the very precise (rubidium) clocks are synchronized externally by GPS signals. However, due to use of Rubidium clocks, this solution is expensive, which prohibits its use for many applications.

SUMMARY OF THE INVENTION

According to one aspect, a method as described in the introduction is provided, the method comprising the steps of: generating a reference signal in a reference oscillator located at a central unit of the radio transmission system, transmitting the reference an optical signal from the central unit to the RF antenna sites via optical fiber links, and using the transmitted reference signal for synchronizing the RF antenna signals of the different antenna sites, for example by using the transmitted reference signal as a common clock signal in each of the antenna sites. In such a way. RF antenna signals of different antenna sites can be synchronized in a reliable and cost-effective way.

The inventors propose to use an optical link to transmit the reference/clock signal from a "master" oscillator at the central site to the "slave" antenna sites via optical fiber links. The inventors have found that the precision of the clock synchronisation realized by this method is given by the short-term jitter. The largest portion of this short-term phase jitter (due to the difference of the optical path length) will be caused by the Polarisation Mode Dispersion (PMD) of the used fibres. Polarization Mode Dispersion is in the order of 0.1/0.5 ps/√km making a total of 0.45/2.25 ps for an inter-site distance of 20 km. This value is far below the required value of 50 ps deviation within a 100 ms measurement period.

Thus, the invention provides a method for phase synchronization (calibration) of distant antennas, and, as a consequence, it is an enabler for the use of coherent network MIMO in Downlink for systems like LTE FDD, as the phases of the distant antennas are stabilized to a degree such that the radio channel can be controlled using feedback loops between the mobile stations and the base station with moderate transmission overhead on the air interface.

In the case of a configuration comprising a NodeB as a central unit with Remote Radio Heads at the antenna sites, there is already a fibre link deployed for the digital baseband signal. In the case of a Radio Access network comprising classical Node Bs and fibre backhauling the same synchronization method can also be realized. In particular, a plurality of co-operating base stations (NodeBs) may serve as antenna sites, and a central site of the communications network comprising the reference oscillator may provide the plurality of base stations with the reference signal. The person skilled in the art will appreciate that one of the NodeBs (antenna sites) may serve as a central site/central unit (master unit), providing the other NodeBs (slaves) with the reference signal. The method descried above is also applicable to multi-element antennas. In this case, the clock distribution, resp. distribution of the reference signal will be provided by an optical backplane.

In one variant, the method further comprises: generating the reference signal with a RF frequency, in particular in the GHz range, and preferably using the reference signal for generating a carrier signal of at least one of the RF antenna signals. The reference signal typically has a frequency which is in the order of magnitude of the frequency of the carrier signal. In particular, the frequency of the reference signal may be equal to the frequency of the carrier signal, or half of the frequency of the carrier signal.

The reference signal may be used as a precise reference (clock signal), or it may be directly used to generate a carrier signal for the RF antenna signal. It will be understood that in the latter case the reference signal can be amplified/regenerated before being used as a carrier.

In another variant, the method further comprises: transmitting a data signal from the central unit to the RF antenna sites. Typically, the data signal is transmitted as a digital signal, for example over an optical fiber. Of course, it is also possible to use the known analogue transmission of the RF antenna signal over fiber (e.g. coaxial cables). However, such an analogue transmission would lead to distortions. The person skilled in the art will appreciate that in contrast to the reference signal which is typically common to all RF antenna sites, typically different data signals are transmitted to different RF antenna sites. For MIMO applications, the data signals usually contain the same user data, albeit with different phases.

In one development of this variant, the data signal and the reference signal are transmitted over separate fiber links. In this case, transmission of the reference signal can be performed independently of the transmission of the data signal.

In another development of this variant, the data signal and the reference signal are transmitted over the same fiber link. As has been described above, there may already be an optical fiber link deployed for transmission of the baseband signal which may also be used for transmitting the reference signal. For the transmission of the data signal and the reference signal concurrently over the same fiber link, there are several options:

A first option is performing wavelength division multiplexing, WDM, for transmitting the data signal and the reference signal at different wavelengths over the same fiber link. In this case, a (Code) WDM scheme may be used for separating the digital data signal and the reference signal.

A second option is performing electrical multiplexing for transmitting the data signal and the reference signal over the same fiber link. When this option is applied, the analogue RF reference signal may be modulated on top of the digital baseband data signal, using electrical insertion/de-insertion (multiplexing) at the optical transmitter of the central site and the optical receiver at the RF antenna site, respectively. Using such an approach, deployment of a second fiber or of WDM splitter/combiner equipment is dispensed with. The electrical multiplexing is possible, as the fiber links are typically relatively short (e.g. less than 20 or 10 km), thus leaving a high reserve in the optical link budget.

A second aspect of the invention is implemented in a radio transmission system, comprising: a plurality of RF antenna sites arranged at different locations, each RF antenna site having at least one RF antenna for generating a RF antenna signal, a central unit comprising a reference oscillator for generating a reference signal, and a plurality of optical fiber links for transmitting the reference signal from the central unit to the plurality of RF antenna sites, wherein the RF antenna sites are adapted to use the transmitted reference signal for synchronizing the RF antenna signals of the different RF antenna sites.

In the radio transmission system described above, the reference signal may be provided as an optical signal which comprises only a single wavelength. Alternatively, the reference signal may comprise two or more components having different wavelengths. In this case, the RF antenna sites comprise a frequency mixer for generating the clock reference (frequency), for example as the difference between the two components of the reference signal. This approach can reduce the phase fluctuations given by variations of the optical length of the fiber and thus reduce the jitter of the received reference signal.

In one embodiment, the reference oscillator is adapted to generate a reference signal with a RF frequency, in particular in the GHz range. The frequency of the reference signal should be in the order of magnitude of the carrier signal of the RF antenna signals in order to perform the synchronization with sufficient precision. Typically, the reference oscillator is adapted to generate an analog electrical signal which is e/o-converted before being transmitted over the optical fiber.

In a further embodiment, at least one RF antenna site is adapted for using the reference signal to generate a carrier signal for the RF antenna signal of the RF antenna site. The easiest way to use the reference signal as a carrier signal is to provide a reference signal having the frequency of the carrier signal, such that the reference signal may be directly used as the carrier signal (possibly after re-amplification/re-generation in the RF antenna site).

Another embodiment of the radio transmission system is adapted for transmission of a data signal from the central unit to the RF antenna sites.

In one development of this embodiment, the radio transmission system comprises at least one additional fiber link for transmitting the data signal from the central unit to the RF antenna sites.

In another development, the radio transmission system further comprises a wavelength division multiplexing, WDM, arrangement (multiplexer/de-multiplexer) for transmitting the reference signal and the data signal over the same fiber link using different wavelengths. The optical multiplexing may be performed using appropriate splitter/combiner equipment.

In one embodiment, the radio transmission system further comprises an electrical multiplexing arrangement for combined transmission of the reference signal and the data signal over the same fiber link. When performing the electrical multiplexing, the signal transmitted over the fiber link may for example comprise the digital data signal as a large signal component and the analog reference signal as a small signal component.

It will be understood that different possibilities of transmitting the optical signal, e.g. as described above (over a separate fiber, using optical or electrical multiplexing) may be implemented in the same transmission system, for example when RF antenna sites with different types of equipment are connected to the same central site.

In one embodiment, each of the optical fiber links has a length of less than 20 km, preferably of less than 10 km. As described above, if possible, the length of the fiber links should not exceed these values in order to guarantee that the clock synchronisation can be performed with high precision.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
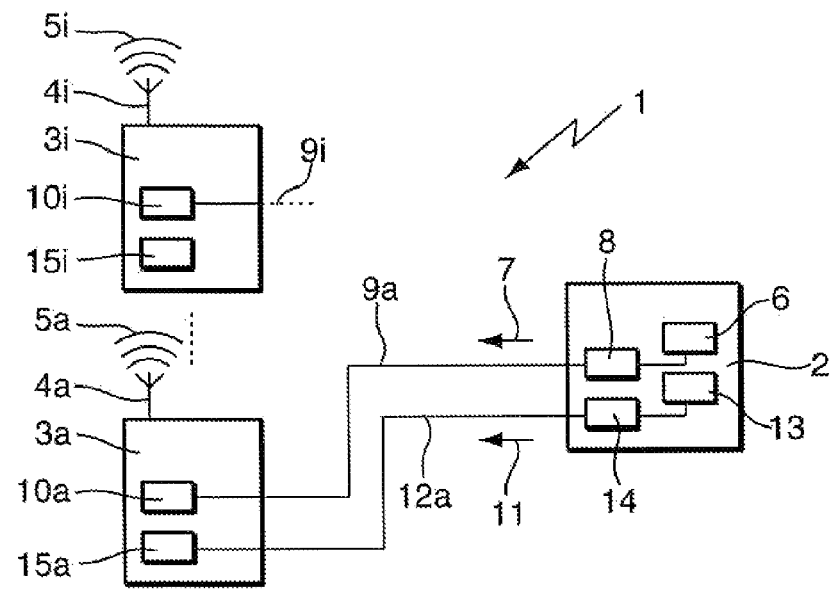
FIG. 1 shows a schematic diagram of a first embodiment of a radio transmission system using separate optical fibers for transmitting a data signal and a reference signal.

FIG. 1 shows a radio transmission system 1 having a central unit 2 in the form of a base station (being a NodeB in the present example), and a plurality of RF antenna sites $3a, \ldots, 3i$ in the form of remote radio heads RRH arranged at different locations remotely from the central unit 2, e.g. being about 1 km away from the central unit 2. Each RF antenna site $3a, \ldots, 3i$ comprises at least one RF antenna $4a, \ldots, 4i$ for generating/transmitting a corresponding RF antenna signal $5a, \ldots, 5i$.

In order to draw maximum benefit from coherent network MIMO transmission in the downlink direction, the RF antennas $4a, \ldots, 4i$ located at the distant RF antenna sites $3a, \ldots, 3i$ should transmit the RF antenna signals $5a, \ldots, 5i$ with correlated phases, i.e. synchronization of the RF antenna signals $5a, \ldots, 5i$ using a common clock/reference signal is required.

For providing such a common clock signal to the RF antennas $4a, \ldots, 4i$, the central unit has a reference oscillator 6 for generating an analog (electrical) reference signal 7. After passing the reference signal 7 through an electro-/optical transmitter 8 (e.g. a laser diode), the reference signal 7 is transmitted over an optical fiber link 9a to the first one of the RF antenna sites 3a. In the present example, the reference signal 7 is provided to a RF modulator 10a of the RF antenna site 3a having a PIN photo-diode for o/e-conversion.

In addition, a digital data signal 11 is also transmitted from the central unit 2 to the first RF antenna site 3a via a separate optical fiber 12a. The data signal 11 is generated in a digital baseband unit 13 of the central unit 2 and is prepared for the optical transmission in a digital electro-/optical transmitter 14 using a semiconductor (laser) diode, the optical power of which is modulated by the data signal 7. The RF antenna site 3a has a digital/analog and optical/electrical converter 15a for converting the digital optical data signal 11 to an analog electrical data signal, e.g. using a PIN photo-diode.

After transmission of the data signal 11 and the reference signal 9 to the RF antenna site 3a, both are used to generate a RF antenna signal 5a which is synchronized with the RF antenna signals $5b, \ldots, 5i$ of the other RF antenna site $5b, \ldots, 5i$.

For this purpose, the reference signal 9 is first regenerated and/or amplified (e.g. in the RF modulator 10a) and than used as a carrier signal for the RF antenna signal 5a, the data signal 11 being converted to analog format and used for modulating the carrier signal. It will be understood that for using the reference signal 7 as the carrier signal, in the simplest case, the frequency of the reference signal 7 corresponds to the frequency of the carrier signal (in the GHz range).

However, it is also possible to have a reference signal 7 with a frequency which is only in the order of magnitude of the carrier signal, e.g. being one half of the carrier frequency. In this case, a frequency up-conversion e.g. using a PLL can be applied to the reference signal 7, the up-conversion being possible as long as the frequency of the reference signal 7 does not significantly deviate from the frequency of the carrier signal, i.e. typically the reference signal 7 has a frequency which is at least 1/10 of the carrier frequency.

It will be understood that alternatively, the reference signal 7 may be used only as a precise clock reference for generating the RF antenna signal 5e in the RF antenna site 3a. Also, it is possible to use a reference signal 7 having more than one, e.g. two optical wavelengths, the reference frequency being reconstructed from the reference signal 7 e.g. by subtracting the two wavelength components of the transmitted reference signal 7 in the RF antenna site 3a. In any case, when using the reference signal 7 as a clock reference, the RF antenna signals 5a to 5i of the different RF antenna sites 3a to 3i can be synchronized.

It will be understood that in the embodiment shown in FIG. 1, transmission of the data signal 11 may alternatively be performed over a standard RF cable, i.e. the data signal 11 may be transmitted as an electrical signal from the central site 2 to the RF antenna sites 3a to 3i.

Figure 2:
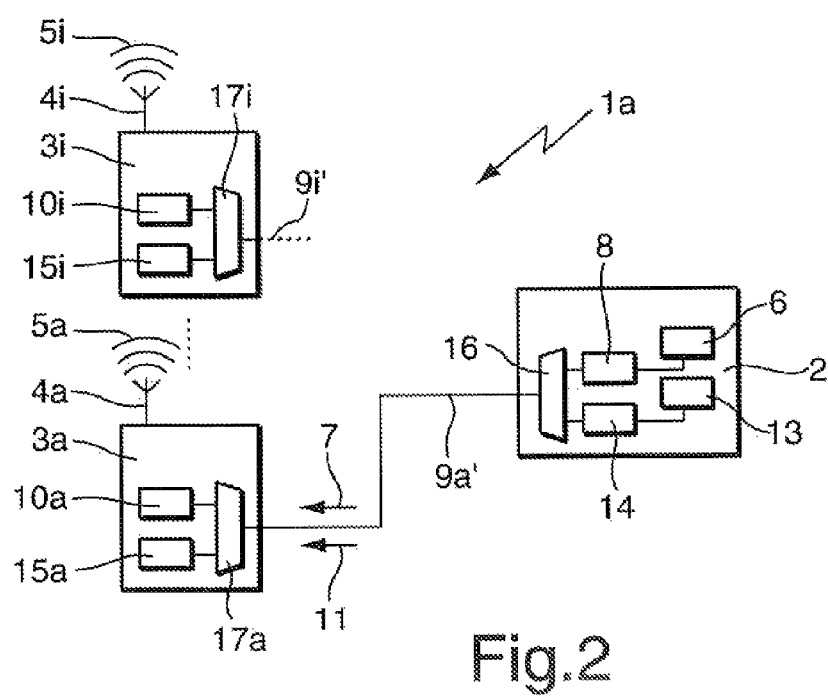
FIG. 2 shows a schematic diagram of a second embodiment of a radio transmission system using a single optical fiber for transmitting the data signal and the reference signal using WDM.

FIG. 2 shows an alternative embodiment of a radio transmission system 1a, having only a single optical fiber 9a' connecting the central site 2 to the RF antenna site 3a. In this case, both the data signal 11 and the reference signal 7 are transmitted over the fiber 9a' using different wavelengths, a (C)WDM multiplexer 16 and a (C)WDM de-multiplexer 17a being arranged at the central site 2 and the RF antenna site 3a, for combining/separating the wavelengths of the data signal 11 and the reference signal 7, respectively.

Figure 3:
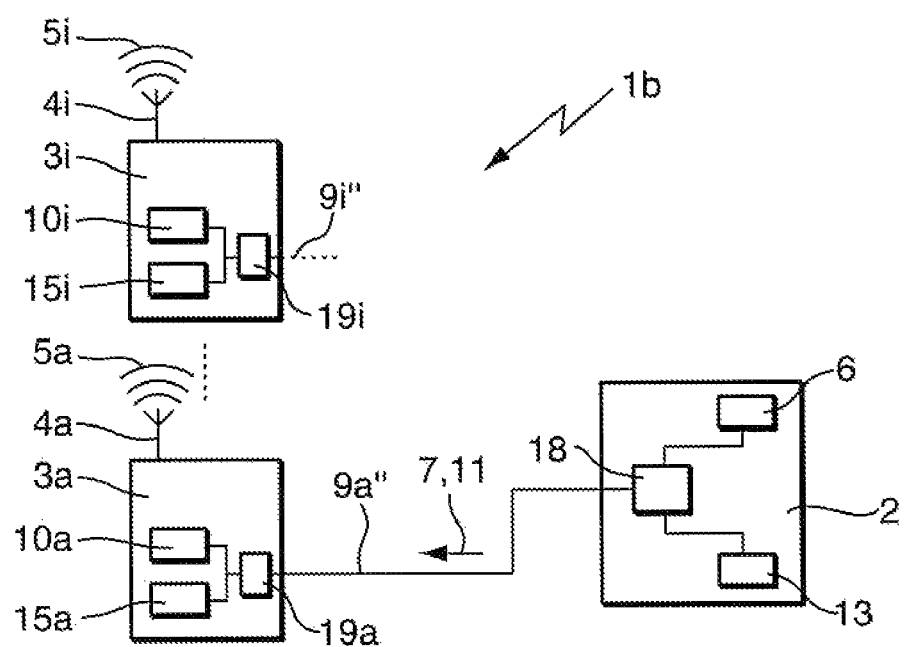
FIG. 3 shows a schematic diagram of a third embodiment of a radio transmission system using a single optical fiber for transmitting the data signal and the reference signal using electrical multiplexing.

In FIG. 3, a further transmission system 1b is shown, also having a single fiber 9a'' for transmitting both the reference signal 7 and the data signal 11 to the first RF antenna site 3a. However, in contrast to the transmission system 1a shown in FIG. 2, the transmission system 1b comprises an electro-/optical transmitter 18 at the central site 2 and an electro-optical receiver 19a at the first RF antenna site 3a. The electrical modulators 18, 19a are used for performing electrical insertion and de-insertion by modulating the analog reference signal 7 on top of the digital baseband signal 11.

In all of the radio transmission systems 1, 1a, 1b described above, the RF antenna sites 3a to 3i use the reference signal 7 transmitted from the central oscillator 6 as a reference instead of a local reference oscillator. It will be understood that although in FIGS. 1 to 3, the RF antenna sites 3a to 3i are of identical structure, the types of transmitting the reference signal 7 and the data signal 11 shown in FIGS. 1 to 3 may be mixed. For example, some of the RF antenna sites 3a to 3i may be connected over a single fiber 9a to the central site 2, whereas others may not.

It will be understood that in this case, the equipment at the central site 2 has to be adapted for this purpose. In this respect, the person skilled in the art will appreciate that although a single wavelength division multiplexer 16 and a single electrical multiplexer 18 are shown, more of these devices may be deployed at the central site 2 for serving the remaining RF antenna sites 3b to 3i over individual optical fiber links (only one of them (9i, 9i'', 9i'') being shown for the sake of simplicity).

In any case, for synchronizing the RF antenna signals 5a to 5i of the different antenna sites 3a to 3i, the length of the fiber links 9a, 9a', 9a'' for transmitting the reference signal should possibly not exceed approx. 20 km, preferably 10 km, as by using such a fiber length, the synchronization of the RF antenna signals 5a to 5i is facilitated, and the phase jitter caused by Polarization Mode Dispersion in the optical fibers having different path lengths is small enough for allowing compensation by feedback mechanisms between the RF antenna sites 3a to 3i and mobile stations (not shown) receiving the RF antenna signals 5a to 5i, thus controlling their phases in the desired way.

The person skilled in the art will appreciate that although the transmission systems 1, 1a, 1b described above use a base station (NodeB) as a central site and Remote Radio Heads (RRHs) as RF antenna sites 3a to 3i, it is also possible for a plurality of co-operating base stations (NodeBs) to serve as antenna sites, a central site of the communications network comprising the reference oscillator serving the plurality or base stations. Also, the method and system described above are applicable to multi-element antennas with a central element comprising the reference oscillator, or to other suitable equipment.

In summary, the approach described above serves as an enabler for the use of coherent MIMO in downlink for systems like LTE FDD, as the phases of the distant RF antennas are stabilized to a degree that the radio channel can be controlled using feedback loops between the mobile stations and the base station (e.g. NodeB) with moderate transmission overhead on the air interface.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as defined by the appended claims, and equivalents thereof.

The invention claimed is:

1. A method for synchronizing Radio Frequency (RF) antenna signals of a plurality of RF antenna sites arranged at different locations of a radio transmission system, the method comprising:
    generating a reference signal having a radio frequency in a central reference oscillator located at a central unit of the radio transmission system;
    transmitting the reference signal as an optical signal from the central unit to the RF antenna sites via optical fiber links;
    using the transmitted reference signal for synchronizing the RF antenna signals of the different antenna sites;
    using the reference signal by at least two of the RF antenna sites for generating a carrier signal for at least two of the RF antenna signals; and
    transmitting the at least two RF antenna signals by at least two of the RF antenna sites;
    wherein said optical signal comprises two components having different wavelengths and wherein said method further comprises generating a clock reference as a difference between the two components by a frequency mixer of the RF antenna sites.

2. The method according to claim 1, further comprising: transmitting a data signal from the central unit to the RF antenna sites.

3. The method according to claim 2, wherein the data signal and the reference signal are transmitted over separate fiber links.

4. The method according to claim 2, wherein the data signal and the reference signal are transmitted over the same fiber link.

5. The method according to claim 4, further comprising: performing wavelength division multiplexing (WDM) for transmitting the data signal and the reference signal at different wavelengths over the same fiber link.

6. The method according to claim 2, further comprising: performing electrical multiplexing for transmitting the data signal and the reference signal over the same fiber link.

7. The method according to claim 1, wherein the reference signal has substantially the same frequency as at least one of the carrier signals generated using the reference signal.

8. A radio transmission system, comprising:
    a plurality of Radio Frequency (RF) antenna sites arranged at different locations, at least one RF antenna site having at least one RF antenna configured to generate a RF antenna signal;
    a central unit comprising a central reference oscillator configured to generate a reference signal having a radio frequency; and
    a plurality of optical fiber links configured to transmit the reference signal as an optical signal from the central unit to the plurality of RF antenna sites,
    wherein the reference oscillator is configured to generate a reference signal having an RF frequency in the GHz range;
    wherein the RF antenna sites are configured to use the transmitted reference signal to synchronize the RF antenna signals of the different RF antenna sites,
    wherein at least two of the RF antenna sites are configured to use the reference signal to generate a carrier signal for the RF antenna signal of the at least two of RF antenna sites, and at least two of the RF antenna sites are configured to transmit the RF antenna signal; and
    wherein said optical signal comprises two components having different wavelengths; and
    wherein a clock reference is generated as a difference between the two components by the RF antenna sites.

9. The radio transmission system according to claim 8, being configured to transmit a data signal from the central unit to the RF antenna sites.

10. The radio transmission system according to claim 9, further comprising at least one additional fiber link configured to transmit the data signal from the central unit to the RF antenna sites.

11. The radio transmission system according to claim 9, further comprising an electrical multiplexing arrangement configured to combine transmission of the reference signal and the data signal over the same fiber link.

12. The radio transmission system according to claim 8, wherein at least one of the RF antenna sites is a site of a single antenna element of a multi-element antenna.

13. The radio transmission system according to claim 8, wherein the reference signal has a radio frequency in the range of 1 GHz to 5 GHz.

14. A radio frequency (RF) antenna site configured to receive a reference signal via an optical fiber link for synchronizing RF antenna signals of different RF antenna sites, wherein the RF antenna site is configured to use the received reference signal having a RF frequency to generate a carrier signal for the RF antenna signal of the RF antenna site and the RF antenna site has at least one RF antenna configured to generated the RF antenna signal, wherein said reference signal comprises two components having different wavelengths and wherein said RF antenna site is further configured to generate a clock reference as a difference between said two components.

15. The RF antenna site according to claim 14, wherein said reference signal is only used as a precise clock reference for the generating of said RF antenna signal in the RF antenna site.

16. The RF antenna site according to claim 14, comprising an RF modulator having a PIN photodiode for optical/electrical conversion and wherein said reference signal is provided to said RF modulator.

17. The RF antenna site according to claim 16, further comprising a wavelength division multiplexing (WDM) de-multiplexer for separating wavelengths of a data signal and said reference signal.

18. The RF antenna site according to claim 16, further comprising an electro-optical receiver configured to perform de-insertion of the reference signal comprising an analog reference signal and being modulated on top of a digital baseband signal.

19. The RF antenna site according to claim 14, wherein said RF antenna site is a base station.

20. The RF antenna site according to claim 14, wherein said RF antenna site is a remote radio head.

21. The RF antenna site according to claim 14, wherein said RF antenna site is a site of a single antenna element of a multi-element antenna.

\* \* \* \* \*